US009823463B2

(12) United States Patent
Umamine (10) Patent No.: US 9,823,463 B2
(45) Date of Patent: Nov. 21, 2017

(54) LIGHT SOURCE UNIT EMITTING THE THREE PRIMARY COLORS OF LIGHT AND PROJECTOR INCLUDING THE LIGHT SOURCE UNIT

(71) Applicant: CASIO COMPUTER CO., LTD., Shibuya-ku, Tokyo (JP)

(72) Inventor: Osamu Umamine, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/981,324

(22) Filed: Dec. 28, 2015

(65) Prior Publication Data

US 2016/0241820 A1    Aug. 18, 2016

(30) Foreign Application Priority Data

Feb. 12, 2015    (JP) .................................. 2015-024939

(51) Int. Cl.
  *G03B 21/14*    (2006.01)
  *H04N 9/31*    (2006.01)
  (Continued)

(52) U.S. Cl.
  CPC ........... *G02B 26/008* (2013.01); *G03B 21/16* (2013.01); *G03B 21/204* (2013.01); *G03B 21/2033* (2013.01); *G03B 31/00* (2013.01); *H04N 9/3114* (2013.01); *H04N 9/3158* (2013.01); *G03B 21/2073* (2013.01)

(58) Field of Classification Search
  CPC .. G03B 21/204; G03B 21/005; G03B 21/006; G03B 21/007; G02B 27/1006; H04N 9/3111; H04N 9/3114; H04N 9/3117
  See application file for complete search history.

(56) References Cited

U.S. PATENT DOCUMENTS 8,562,141 B2 * 10/2013 Ogino ................ G03B 21/2013
                                                                    353/38
9,046,746 B2    6/2015 Ohsugi
                (Continued)

FOREIGN PATENT DOCUMENTS

CN    104020634 A    9/2014
JP    2013097233 A    5/2013
          (Continued)

OTHER PUBLICATIONS

Chinese Office Action dated May 26, 2017 (and English translation thereof), issued in counterpart Chinese Application No. 201610075247.9.

*Primary Examiner* — William C Dowling
(74) *Attorney, Agent, or Firm* — Holtz, Holtz & Volek PC (57) ABSTRACT

To provide a light source unit whose overall size is relatively small and a projector which incorporates the light source unit, there is provided a light source unit including a first light source device for emitting light in a first wavelength range, a second light source device which is disposed on an axis of the light in the first wavelength range and having a luminescent light emitting area for emitting light in a second wavelength range by receiving the light in the first wavelength range, and a third light source device which is disposed on the axis of the light in the first wavelength range so as to face the first light source device for emitting light in a third wavelength range.

14 Claims, 6 Drawing Sheets

(51) Int. Cl.
*G02B 26/00* (2006.01)
*G03B 21/16* (2006.01)
*G03B 31/00* (2006.01)
G03B 21/20 (2006.01)

(56) References Cited

U.S. PATENT DOCUMENTS

| | | | |
|---|---|---|---|
| 9,513,539 B2* | 12/2016 | Kurosaki | G03B 21/14 |
| 2012/0327374 A1* | 12/2012 | Kitano | G03B 21/16 |
| | | | 353/31 |
| 2013/0044296 A1* | 2/2013 | Hsu | H04N 9/3161 |
| | | | 353/33 |
| 2013/0135592 A1* | 5/2013 | Okuda | F21V 13/00 |
| | | | 353/31 |
| 2014/0254130 A1 | 9/2014 | Mehl | |
| 2015/0234264 A1* | 8/2015 | Kurosaki | G03B 33/12 |
| | | | 353/31 |
| 2016/0057397 A1* | 2/2016 | Kurosaki | H04N 9/3152 |
| | | | 353/31 |

FOREIGN PATENT DOCUMENTS

| | | |
|---|---|---|
| JP | 2014053844 A | 3/2014 |
| JP | 2014134806 A | 7/2014 |

* cited by examiner

LIGHT SOURCE UNIT EMITTING THE THREE PRIMARY COLORS OF LIGHT AND PROJECTOR INCLUDING THE LIGHT SOURCE UNIT

CROSS REFERENCE TO RELATED APPLICATION

This application is based upon and claims the benefit of priority under 35 U.S.C. 119 of Japanese Patent Application No. 2015-24939 filed on Feb. 12, 2015, the entire disclosure of which, including the description, claims, drawings and abstract, is incorporated herein by reference.

BACKGROUND OF THE INVENTION

Field of the Invention

The present invention relates to a light source unit which emits the three primary colors of light and a projector which includes this light source unit.

Description of the Related Art

In these days, data projectors are used on many occasions as an image projection system which projects an image of a screen and a video image of a personal computer, as well as images based on image data which is stored on a memory card or the like on to a screen. In these data projectors, light emitted from a light source is collected to a micromirror display device called a DMD (Digital micromirror Device) or a liquid crystal panel for displaying a color image on the screen.

Conventionally, the mainstream of these data projectors has been those which utilize a high-intensity discharge lamp as a light source. In recent years, however, there have been developed and proposed many projectors which utilize, as light sources, light emitting devices or laser diodes, or organic ELs or luminescent materials.

For example, the applicant of this patent application proposed a projector which was made public in Japanese Unexamined Patent Publication No. 2014-053844. This projector utilizes a light source unit having a green light source device, a red light source device and a blue light source device. The green light source device includes an excitation light shining device and a luminescent light emitting device. The red light source device and the blue light source device utilize light emitting diodes.

In this light source unit, a first dichroic mirror is provided between the excitation light shining device and the luminescent light emitting device, so that the first dichroic mirror transmits excitation light and light in the red wavelength range from the red light source device and reflects light in the green wavelength range from the luminescent light emitting device, whereby the axis of the light in the red wavelength range which has passed through the first dichroic mirror and the axis of the light in the green wavelength range which has been reflected by the first dichroic mirror are made to coincide with each other. Then, the light in the green wavelength range and the light in the red wavelength range whose axes are made to coincide with each other are reflected by a second dichroic mirror. This second dichroic mirror transmits light in the blue wavelength range from the blue light source device, so that the axis of the light in the blue wavelength range is made to coincide with the axes of the light in the green wavelength rage and the light in the red wavelength range. Then, the green light, red light and blue light whose axes now coincide with one another are emitted from the light source unit.

The application of this patent application also proposed a projector which was made public in Japanese Unexamined Patent Publication No. 2013-097233. This projector utilizes a light source unit having an excitation light shining device which doubles as a blue light source device, a luminescent light emitting device having a luminescent material wheel including a diffuse transmission portion and a red light source device utilizing a light emitting diode.

In this light source unit, a first dichroic mirror is provided between the excitation light shining device and the luminescent light emitting device, so that the first dichroic mirror transmits excitation light and light in the red wavelength range from the red light source device and reflects light in the green wavelength range from the luminescent light emitting device, whereby the axis of the light in the red wavelength range which has passed through the first dichroic mirror and the axis of the light in the green wavelength range which has been reflected by the first dichroic mirror are made to coincide with each other. Further, light in the blue wavelength range is excitation light which is emitted from the luminescent material wheel to a side opposite to a side facing the excitation light shining device after having passed through the diffuse transmission portion of the luminescent material wheel, and this light in the blue wavelength range is reflected by two reflection mirrors so that the axis thereof becomes parallel to the axis of luminescent light. Then, the light in the blue wavelength range is incident on a second dichroic mirror for transmission therethrough. Thus, the axis of the light in the blue wavelength range which has passed through the second dichroic mirror is made to coincide with the axes of the light in the red wavelength range and the light in the green wavelength range whose axes are made to coincide with each other by the first dichroic mirror and which have then been reflected by the second dichroic mirror, whereby the red light, green light and blue light whose axes coincide with one another are emitted from the light source unit.

In addition, as described in Japanese Unexamined Patent Publication No. 2014-134806, a light source is also proposed which utilizes ultraviolet radiation as excitation light and a rotary wheel to which a red luminescent material, a green luminescent material and a blue luminescent material are applied.

In this light unit, ultraviolet radiation is shone on to the rotary wheel on which the red luminescent material, the green luminescent material and the blue luminescent material are disposed along a circumferential direction of the rotary wheel as excitation light so as to make the luminescent materials, which are situated in positions where the excitation light is shone, luminous, whereby light in the red wavelength range, light in the green wavelength range and light in the blue wavelength range are emitted sequentially from the rotary wheel.

As has been described heretofore, with the light source unit including, as the three primary color sources, the luminescent material which emits the light in the green wavelength range, the red light source device made up of the light emitting diodes which emits the light in the red wavelength range and the blue light source device made up of the light emitting diodes which emits the light in the blue wavelength range, the number of single-color light source devices and the number of optical components for making the optical paths of the single-color light rays emitted from the single-color light source devices coincide with one another so that the axes of the single-color light rays coincide with one another are increased, making it difficult to realize a small three primary color light source unit, which hence makes it difficult to realize a small projector.

With the three primary color light source in which the excitation light source device doubles as the blue light source device, the number of single-color light source devices is reduced. However, the number of optical components for making the optical paths and axes of the luminescent light emitted from the luminescent material wheel and the light in the blue wavelength range, which has passed through the luminescent material wheel while being diffused, coincide with each other is increased, also making it difficult to realize a small three primary color light source unit, which hence makes it difficult to realize a small projector.

In addition, with the light source unit in which the light in the red wavelength range, the light in the green wavelength range and the light in the blue wavelength range are emitted from the luminescent materials which are applied to the rotary wheel, it is relatively easy to reduce the number of optical components and to realize a small three primary color light source unit. However, the luminescent light emitted from each of the luminescent materials constitutes the red, green and blue light whose hue shifts slightly relative to those of the three primary colors. In particular, the red luminescent material is inferior in luminance, color purity and luminous efficiency to LED, causing a problem that with the red luminescent material, it is difficult to form a bright projected image having a superior color reproduction performance.

SUMMARY OF THE INVENTION

An object of the invention is to provide a light source unit having a superior color reproduction performance and a relatively small overall size and a projector including the light source unit.

According to a first of the invention, there is provided a light source unit having a first light source device which emits light in a first wavelength range, a second light source device which is disposed on an axis of the light in the first wavelength range and which has a luminescent light emitting area which receives the light in the first wavelength range to thereby emit light in a second wavelength range, and a third light source device which is disposed on the axis of the light in the first wavelength range so as to face the first light source device.

According to a second aspect of the invention, there is provided a projector having the light source unit according to the first aspect of the invention, a display device which generates image light, a projection side optical system which projects image light emitted from the display device on to a screen, and a projector control unit which controls the light source unit and the display device.

DETAILED DESCRIPTION OF PREFERRED EMBODIMENTS

First Embodiment

Figure 1:
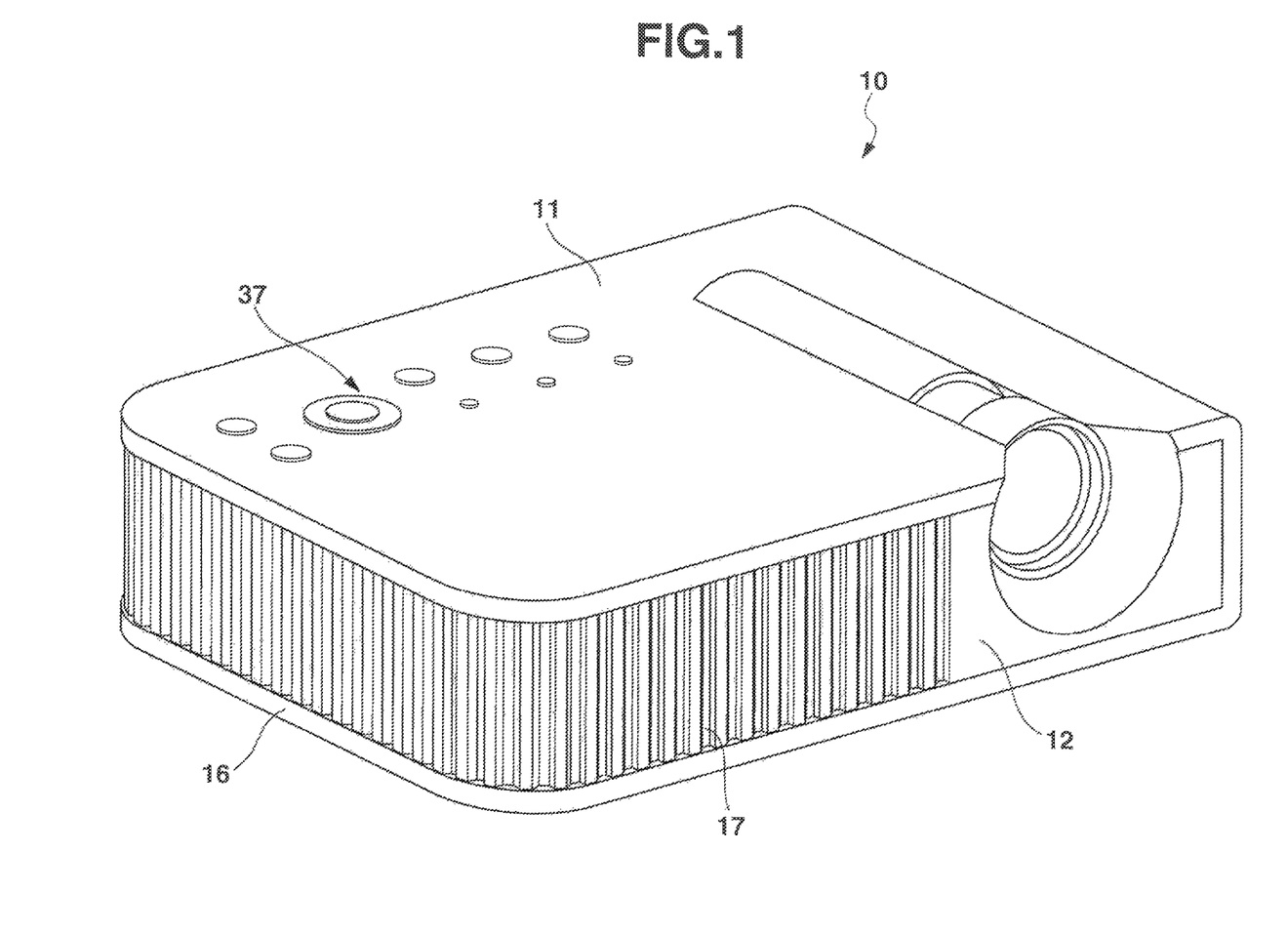
FIG. 1 is a perspective view showing an external appearance of a projector according to a first embodiment of the invention.

Hereinafter, an embodiment of the invention will be described based on the accompanying drawings. FIG. 1 is an external perspective view of a projector 10. When referred to in relation to the projector 10 in this embodiment, left and right denote, respectively, left and right with respect to a projecting direction, and front and rear denote, respectively, front and rear with respect to a direction towards a screen from the projector 10 and a traveling direction of a pencil of light emitted from the projector 10.

The projector 10 has, as shown in FIG. 1, a substantially rectangular parallelepiped shape. The projector 10 has a projection port provided to a side of a front panel 12 which is a front side panel of a projector casing. A plurality of inside air outlet ports 17 are provided in the front panel 12. Further, although not shown, the projector 10 includes an Ir reception unit which receives a control signal from a remote controller.

Additionally, a keys/indicators unit 37 is provided on an upper case 11 of the projector casing. Disposed on this keys/indicators unit 37 are keys and indicators which include a power indicator, a projection switch key, an overheat indicator, and the like. The power indicator informs whether a power switch key or a power supply is on or off. The projection switch key switches on and off the projection by the projector 10. The overheat indicator informs of an overheat condition occurring in a light source unit, a display device, a control circuit or the like when they really overheat. In addition, the upper case 11 covers an upper surface and part of a left side surface of the casing of the projector 10, so that the upper case 11 is removed from a lower case 16 when the projector 10 fails.

An input-output connector unit where a USB terminal, an image signal input D-SUB terminal where analog RGB image signals are inputted, an S terminal, an RCA terminal, a voice or sound output terminal and the like are provided and various terminals which include a power supply adaptor plug and the like are provided on a back panel, not shown, of the casing. In addition, a plurality of outside air inlet ports are formed in the back panel.

Figure 2:
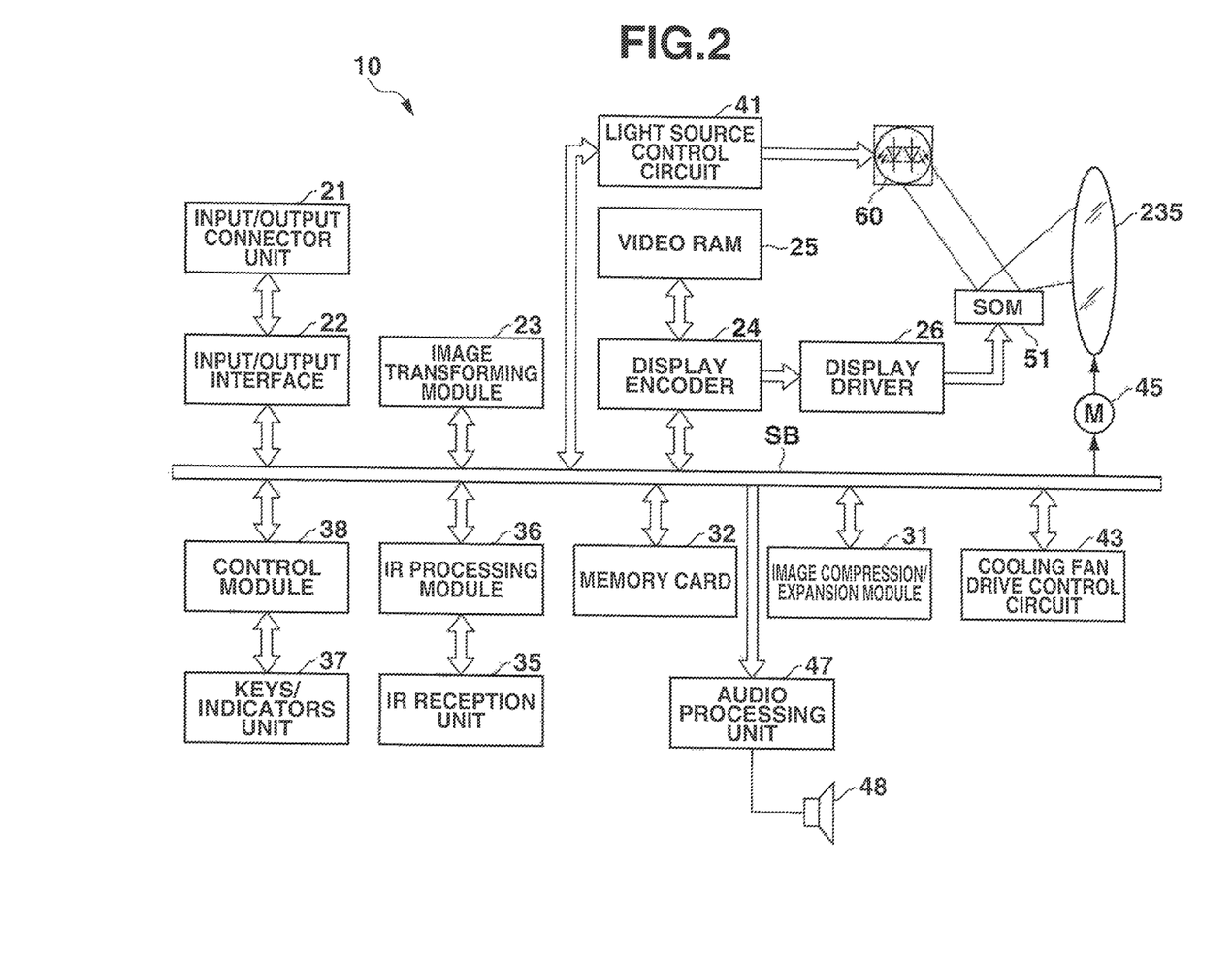
FIG. 2 is a functional block diagram of the projector according to the first embodiment of the invention.

Next, a projector control unit of the projector 10 will be described by the use of a functional block diagram shown in FIG. 2. The projector control unit includes a control module 38, an input-output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards that are inputted from the input-output connector unit 21 are sent via the input-output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to an output of the image signal from the display encoder 24. Then, in this projector 10, a pencil of light that is emitted from a light source unit 60 is shone onto the display device 51 via a light source side optical system, whereby an optical image (image light) is formed by using reflected light reflected by the display device 51. The image so formed is then projected on to a screen, not shown, for display thereon via a projection side optical system. A movable lens group 235 of the projection side optical system is driven by a lens motor 45 for zooming or focusing.

An image compression-expansion module 31 performs a recording process of data compressing a brightness signal and a color difference signal of the image signal to be sequentially written on a memory card 32 that is a detachable recording medium through operations using ADCT and the Huffman method.

Further, when in a reproducing mode, the image compression-expansion module 31 reads out the image data recorded on the memory card 32 and expands individual image data which make up a series of dynamic images frame by frame. Then, the image compression-expansion module 31 outputs the image data to the display encoder 24 via the image transforming module 23 so as to enable the display of dynamic images based on the image data stored on the memory card 32.

Operation signals generated at the keys/indicators unit 37 which includes the main keys and the indicators which are provided on the upper case 11 of the casing are sent out directly to the control module 38. Key operation signals from the remote controller are received by the Ir reception unit 35, and code signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a loudspeaker 48 to output loudly sound or voice based on the audio data.

The control module 38 controls a light source control circuit 41 which is configured as a light source control unit. This light source control circuit 41 controls separately and individually the emission of light in the red wavelength range, light in the green wavelength range and light in the blue wavelength range from the light source unit 60 so that predetermined wavelength ranges of light required when an image is generated can be emitted from the light source unit 60.

The control module 38 causes a cooling fan drive control circuit 43 to detect temperatures through a plurality of temperature sensors which are provided in the light source unit 60 so as to control the rotating speeds of cooling fans based on the results of the temperature detections. The control module 38 also controls the cooling fan drive control circuit 43 so that the cooling fans continue to rotate even after the power supply to a projector main body is turned off through a timer or the power supply to the projector main body is turned off depending upon the results of the temperature detections by the temperature sensors.

Figure 3:
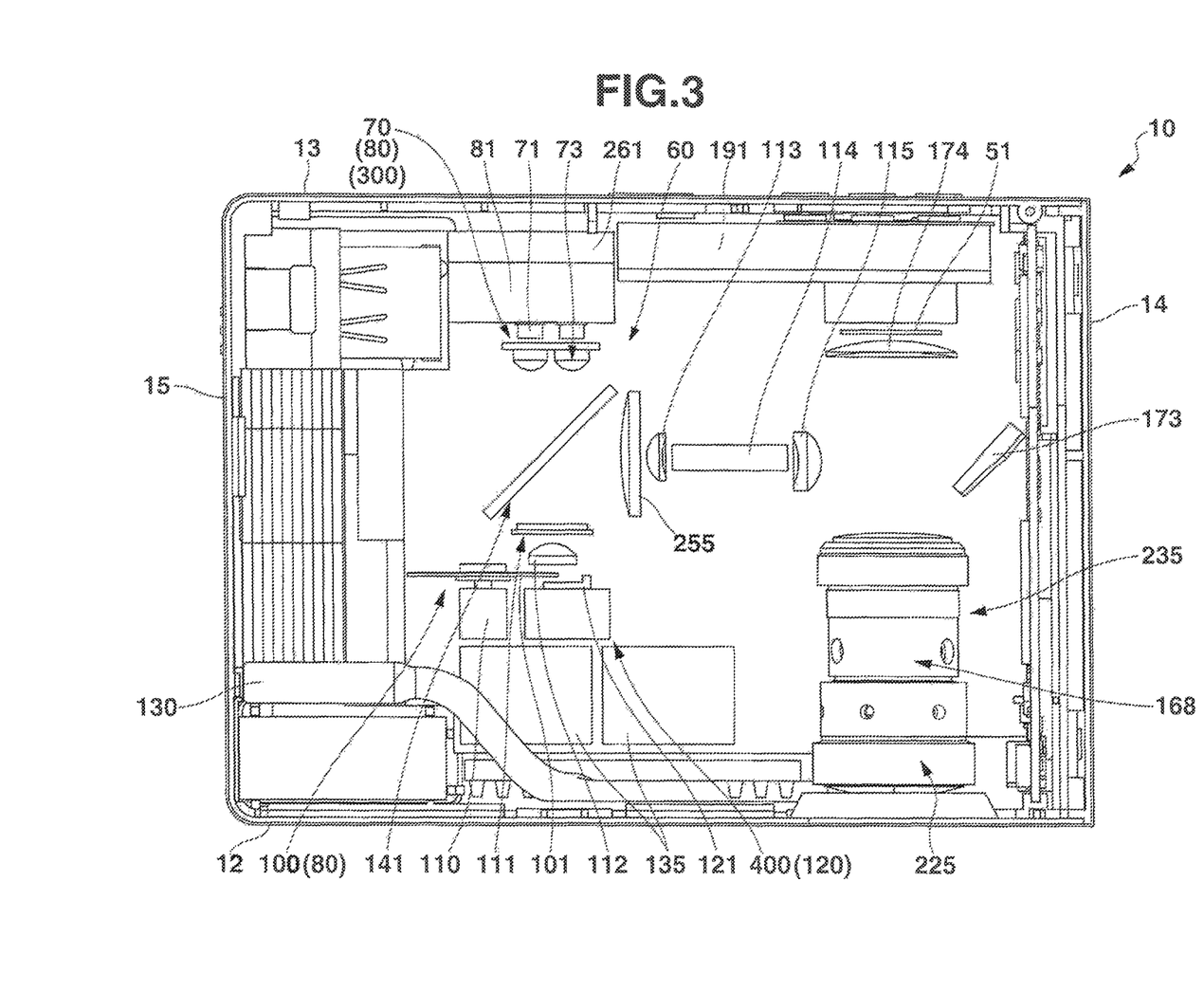
FIG. 3 is a schematic plan view showing an internal construction of the projector according to the first embodiment of the invention.

Next, an internal construction of the projector 10 will be described. FIG. 3 is a schematic plan view showing the internal construction of the projector 10. Here, the light source unit 60 of the projector 10 includes a first light source device 70, a second light source device 100, and a third light source device 400. In the projector 10, the light source side optical system includes collective lenses 255, 113, 115, a light tunnel 114, a light axis direction changing mirror 173 and a condenser lens 174. Further, the projector 10 includes the projection side optical system 168.

As shown in FIG. 3, in the projector 10, the light source unit 60 is disposed at a central portion, and the projection side optical system 168 which includes a lens barrel 225 is disposed at a left-hand side thereof. The display device 51 including DMDs is disposed between the lens barrel 225 and the back panel 13. The projector 10 includes further a main control circuit board, not shown.

The light source unit 60 includes the first light source device 70 which is disposed at a substantially central portion of the casing of the projector 10 in relation to a left-to-right direction of the casing. Further, the light source unit 60 includes a luminescent material wheel device as the second light source device 100, a red light source device 120 as the third light source device 400, a polarizing dichroic mirror 141 and a quarter-wave plate 111 on an axis of a pencil of light emitted from the first light source device 70. Specifically, the luminescent material wheel device as the second light source device 100 is disposed near the front panel 12, and the red light source device 120 as the third light source device 400 is disposed near the front panel 12. The polarizing dichroic mirror 141 is provided between the first light source device 170 and the second light source device 100, and the quarter-wave plate 111 is disposed between the polarizing dichroic mirror 141 and the second light source device 400.

The projector 10 includes a heat sink 191 for cooling the display device 51 between the display device 51 and the back panel 13.

The first light source device 70 includes blue light sources 71 made up of solid-state light emitting devices and collimator lenses 73. The blue light sources 71 are disposed so that their optical axes are perpendicular to the back plate 13. The collimator lenses 73 collect light emitted from the blue light sources 71 which are first light sources to a predetermined range for emission therefrom. The first light source device 70 is a blue light source device 300 and also doubles as an excitation light source device of a green light source device 80.

In the first light source device 70, two blue laser diodes are disposed side by side, and these blue laser diodes are solid-state light emitting devices which emit light in the blue wavelength range. Then, the collimator lenses 73 are disposed individually on optical axes of the blue laser diodes which are the blue light sources 71.

Then, the light source unit 60 includes a heat sink 81 between the first light source device 70 and the back panel 13. A cooling fan 261 is disposed between the heat sink 81 and the back panel 13, and this cooling fan 261 functions as a blower fan which blows outside air into the casing towards the heat sink 81 as a cooling medium, and the first light source device 70 is cooled by the cooling fan 261 and the heat sink 81.

The green light source device 80 is made up of the second light source device 100 which is the luminescent material wheel device and the first light source device 70 which functions as the excitation light source device. The second light source device 100 includes a luminescent material wheel 101, a wheel motor 110, and a collective lens 112. The luminescent material wheel 101 is disposed so as to be made parallel to the front panel 12, that is, so as to be at right angles to an axis of light emitted from the first light source device 70. The wheel motor 110 drives to rotate the luminescent material wheel 101. The collective lens 112 collects a pencil of light emitted from the luminescent material wheel 101 in the direction of the back panel 13.

The luminescent material wheel 101 is made of a circular metallic base material. A luminescent light emitting area 102 is formed into an annular recess portion on the luminescent material wheel 101, and this luminescent light emitting area 102 functions as a second light source which uses light emitted from the blue light sources 71 as excitation light to emit luminescent light having a green wavelength range. Additionally, a surface of the luminescent material wheel 101 which includes the luminescent light emitting area 102 and which faces the first light source device 70 is mirror finished through silver deposition into a reflecting surface which reflects light, and a layer of green luminescent material is laid on this reflecting surface.

Light emitted from the first light source device 70 to be shone onto the green luminescent material layer on the luminescent material wheel 101 excites the green luminescent material laid on the luminescent light emitting area 102. Luminescent light which is emitted from the green luminescent material in every direction is emitted directly towards the first light source device 70 or is reflected by the reflecting surface of the luminescent material wheel 101 to thereafter be emitted towards the first light source device 70. A heat sink 130 and a cooling fan 135 are disposed between the wheel motor 110 and the front panel 12, whereby the luminescent material wheel 101 is cooled by them.

The third light source device 400 which is made up of the red light source device 120 is disposed so that an axis of light emitted therefrom substantially coincides with an axis of light emitted from the first light source device 70. The red light source device 120 includes a red light source 121 and is disposed so as to face the first light source device 70 so that the collective lens 112 can be shared with the second light source device 100 to collect light emitted from the red light source 121 into a predetermined rage of light.

In this way, the blue light source device 300 which is the first light source device 70, the green light source device 80 which is the second light source device 100 and the red light source device 120 which is the third light source device 400 are disposed so that an axis of light in the blue wavelength range emitted from the blue light sources 71 of the first light source device 70, an axis of light in the green wavelength range emitted from the luminescent material wheel 101 and an axis of light in the red wavelength range emitted from the red light source 121 substantially coincide with one another. The red light source 121 which constitutes a third light source utilizes a red light emitting diode which is a solid-state light emitting device which emits light in the red wavelength range.

In the light source unit 60, the polarizing dichroic mirror 141 is disposed between the first light source device 70 and the second light source device 100 in such a way as to intersect light emitted from the first light source device 70 and light emitted from the second light source device 100 at an angle of 45 degrees. The polarizing dichroic mirror 141 has a characteristic to reflect all light in the green wavelength range, which is light in a second wavelength range, emitted from the second light source device 100 and light in the red wavelength range, which is light in a third wavelength range, emitted from the third light source device 400 and to transmit or reflect light in the blue wavelength range, which is light in a first wavelength range, emitted from the first light source device 70 depending upon a polarized direction thereof.

In this embodiment, the polarizing dichroic mirror 141 and the first light source device 70 are disposed so that P-polarized light emitted from the first light source device is transmitted and S-polarized light whose polarized direction differs 90 degrees from that of the P-polarized light is reflected.

In the light source unit 60, the quarter-wave plate 111 is disposed between the polarizing dichroic mirror 141 and the second light source device 100. The quarter-wave 111 changes a polarizing direction of light, which the quarter-wave plate 111 transmits, from linear or plane polarization to circular polarization or from circular polarization to linear or plane polarization.

Figure 4:
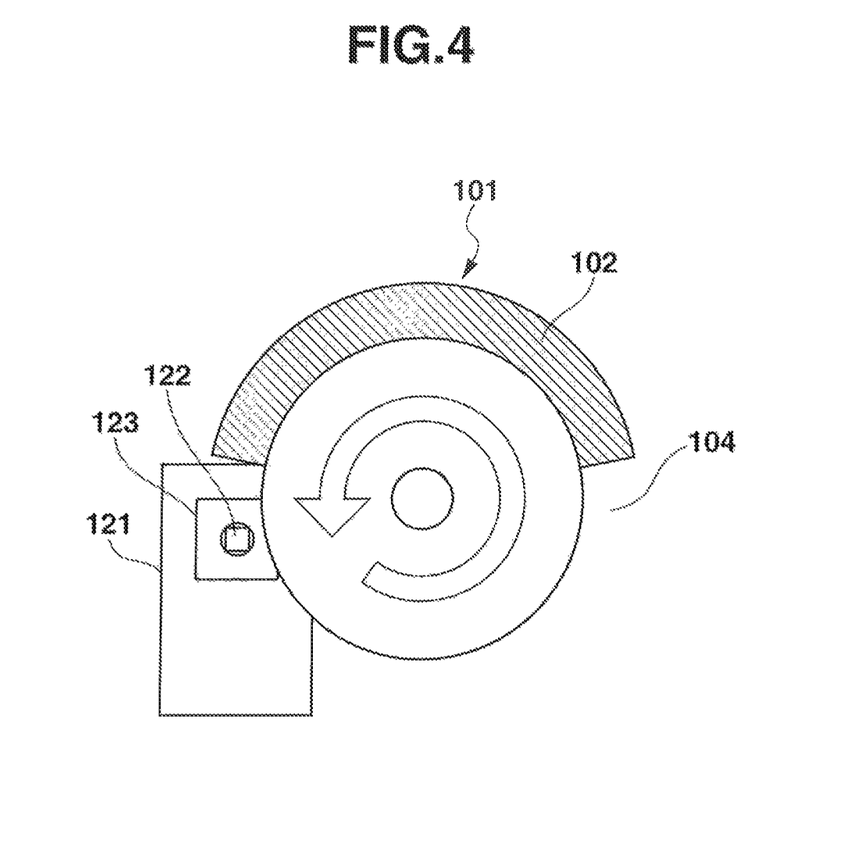
FIG. 4 is a front view of a luminescent material wheel and a third light source device according to the first embodiment of the invention.

FIG. 4 is a front view of the luminescent material wheel 101 and the red light emitting diode which makes up the third light source device 400. The luminescent material wheel 101 has the luminescent light emitting area 102 on the side facing the first light source device 70 and has an annular transmitting area 104 which is formed by a cutout portion which is aligned circumferentially with the luminescent light emitting area 102. The transmitting area 104 does not have to be the cutout portion and hence may be made up of a light transmitting material which is formed in a circumferential direction of the luminescent light emitting area 102. Additionally, the red light source 121 has a light emitting surface 122 which emits light in the red wavelength range and a glass cover 123 and is disposed on a rear surface side of the luminescent material wheel 101 with respect to the first light source device 70.

The luminescent light emitting area 102 is an area which shines light in the green wavelength range, which is excited by shining light in the blue wavelength range from the blue light sources on to the green luminescent material, in the direction of the blue light sources 71. The transmitting area 104 is an area which transmits light in the blue wavelength range emitted from the blue light sources 71 and light in the red wavelength range emitted from the red light source 121.

Figure 5:
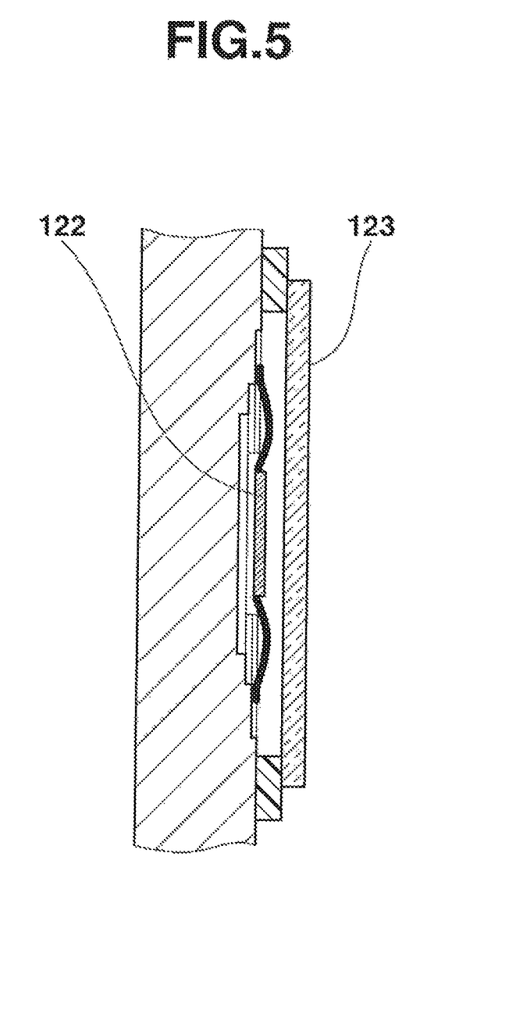
FIG. 5 is an enlarged sectional view of a main part of a red light emitting diode which functions as the third light source device according to the first embodiment of the invention.

FIG. 5 is an enlarged sectional view of a main part of the red light emitting diode. As a general structure, the red light source 121 has the light emitting surface 122 and the glass cover 123 which covers the light emitting surface 122. In this embodiment, the light emitting surface 122 is formed into a reflecting surface which reflects light in the blue wavelength range.

An optical path of light in the blue wavelength range which is emitted from the first light source device 70 which doubles the blue light source device 300 and the excitation light source device of the light source unit 60 will be described in detail hereinafter. Light in the blue wavelength range which is light in the first wavelength range emitted from the blue light sources 71 towards the front panel 12 passes through the polarizing dichroic mirror 141. Namely, the blue light sources 71 are attached to the casing of the projector 10 so that a polarizing plane of light in the blue wavelength range from the blue light sources 71 which are made up of laser diodes becomes such that light in the blue wavelength range becomes P-polarized light in the blue wavelength range in the polarizing dichroic mirror 141.

The P-polarized light in the blue wavelength range which has passed through the polarizing dichroic mirror 141 passes through the quarter-wave plate 111 and is changed from the P-polarized, linearly polarized light to P-polarized, circularly polarized light. The light in the blue wavelength range which has passed through the quarter-wave plate 111 is collected by the collective lens 122 and then passes through the transmitting area 104 of the luminescent material wheel 101.

Then, the light in the blue wavelength range which has passed through the transmitting area 104 is reflected in the direction of the blue light sources 71 on the light emitting surface 122 of the red light source 121 and passes again through the quarter-wave plate 111, whereby the circularly polarized light is again changed to linearly polarized light, resulting in S-polarized light in the blue wavelength range. The S-polarized light in the blue wavelength range is reflected on the polarizing dichroic mirror 141 and is then emitted towards a left side panel 14.

The laser beams emitted from the blue light sources 71 and reflected on the light emitting surface 122 are made into non-coherent light as a result of being reflected on the light emitting surface 122.

The wavelength of light in the blue wavelength range is shorter than the wavelength of light in the red wavelength range, and the optical energy of light in the blue wavelength range is higher than the optical energy of light in the red wavelength range. Consequently, in the event of light in the blue wavelength range being shone on to the light emitting surface 122 to be reflected thereon, a phenomenon reverse to the emission principle is produced, and although it is minute, an electric current flows in shining light in the blue wavelength range on to the light emitting surface 122 of the red light source 121. Therefore, by providing a separate circuit on the red light source 121 for detection of the electric current, the red light source 121 can be used to detect the rotation of the luminescent material wheel or the output of light in the blue wavelength range.

Light in the green wavelength range emitted by the green light source device 80 will be described in detail hereinafter. When emitted from the first light source device 70 towards the front panel 12, light in the blue wavelength range passes through the polarizing dichroic mirror 141. Namely, the polarizing dichroic mirror 141 transmits P-polarized light in the blue wavelength range. The light in the blue wavelength range which has passed through the polarizing dichroic mirror 141 passes through the quarter-wave plate 111 to thereby be changed into circularly polarized light. The light in the blue wavelength range which has passed through the quarter-wave plate 111 is collected by the collective lens 112 and is then shone on to the luminescent light emitting area 102 of the luminescent material wheel 101.

The light in the blue wavelength range which has been shone on to the luminescent light emitting area 102 excites the green luminescent material in the green luminescent material layer, whereby light in the green wavelength range is emitted from the luminescent material wheel 101 towards the blue light sources 71. The light in the green wavelength range which has been emitted is collected by the collective lens 112. Then, the light in the green wavelength range which is reflected in the direction of the blue light sources 71 passes through the quarter-wave plate 111 to be polarized, whereafter the light in the green wavelength range is reflected on the polarizing dichroic mirror 141 to thereby be emitted towards the left side panel 14.

An optical path of light emitted from the red light source device 120 will be described in detail. When emitted from the red light source 121 towards the back panel 13, light in the red wavelength range passes through the transmitting area 104 of the luminescent material wheel 101 and is thereafter collected by the collective lens 112. Then, the light in the red wavelength range so collected passes through the quarter-wave plate 111 to be polarized, whereafter the light in the red wavelength range is reflected on the polarizing dichroic mirror 141 to thereby be emitted towards the left side panel 14.

The collective lenses 255, 113 which collect light emitted from the light sources, the light tunnel 114 which uniformly distributes the intensity of a pencil of light passing therethrough, and the collective lens 115 which collects the light emerging from the light tunnel 114 are disposed on a side of the polarizing dichroic mirror 141 which faces the left side panel 14.

A solid optical glass rod which is a light guiding rod or an array of microscopic lenses may be used in place of the light tunnel 114 to realize light source light whose intensity is uniformly distributed.

The condenser lens 174 shines effectively the light source light reflected on the light axis changing mirror 173 on to the display device 51. The heat sink 191 is disposed between the display device 51 and the back panel to cool the display device 51.

The lens barrel 225 of the projection side optical system 168 has a group of lenses which projects "on" light, which is reflected on the display device 51, onto a screen. A variable-focus lens is used as this projection side optical system 168, and this variable-focus lens has a zooming function by this variable-focus lens being made up of a fixed lens group which is incorporated in the lens barrel 225 and the movable lens group 235 which is incorporated in a movable lens barrel, whereby making it possible to perform a zooming adjustment or a focusing adjustment by a lens motor causing the movable lens group 235 to be moved.

Second Embodiment

In the first embodiment, the light emitting surface 122 of the red light source 121 which makes up of the red light source device 120 is made into the reflecting surface configured to reflect light in the blue wavelength range. However, there may be a situation in which not the light emitting surface 122 of the red light source 121 but the cover glass 123 of the red light source 121 is used as the reflecting surface which reflects light in the blue wavelength range.

Namely, a dichroic coating treatment or the like is applied to a surface of a cover glass 123 which covers a light emitting surface 122 of a red light source 121 to form a reflecting surface which reflects light in the blue wavelength range while transmitting light in the red wavelength range. Additionally, a diffusing layer is also provided on the reflecting surface so as to diffuse light transmitted and light reflected.

As this occurs, not being limited to the red light emitting diode (R-LED), a red laser diode can also be used as the red light source 121.

In this embodiment, too, as with the first embodiment, light in the blue wavelength range emitted from blue light sources 71 towards a front panel 12 passes through a polarizing dichroic mirror 141 and then passes through a quarter-wave plate 111, whereby the P-polarized, linearly polarized light in the blue wavelength range is changed into P-polarized, circularly polarized light in the blue wavelength range, which is collected by a collective lens 112 to pass through a transmitting area 104 of a luminescent material wheel 101.

Then, the light in the blue wavelength range which has passed through the transmitting area 104 is reflected on the surface of the cover glass 123 of the red light source 121 in the direction of the blue light sources 71. Then, the light in the blue wavelength range so reflected passes through the transmitting area 104 of the luminescent material wheel 101 again and is then collected by the collective lens 112. The light in the blue wavelength range so collected then passes through the quarter-wave plate 111 again, whereby the circularly polarized light is changed into linearly polarized light, resulting in S-polarized light in the blue wavelength range. Then, the S-polarized light in the blue wavelength range is reflected by the polarizing dichroic mirror 141 and is then emitted towards a left side panel 14.

When reflected on the surface of the cover glass 123, the laser beams from the blue light sources 71 are formed into non-coherent light by the diffusing layer formed on the surface of the cover glass 123.

Third Embodiment

Figure 6:
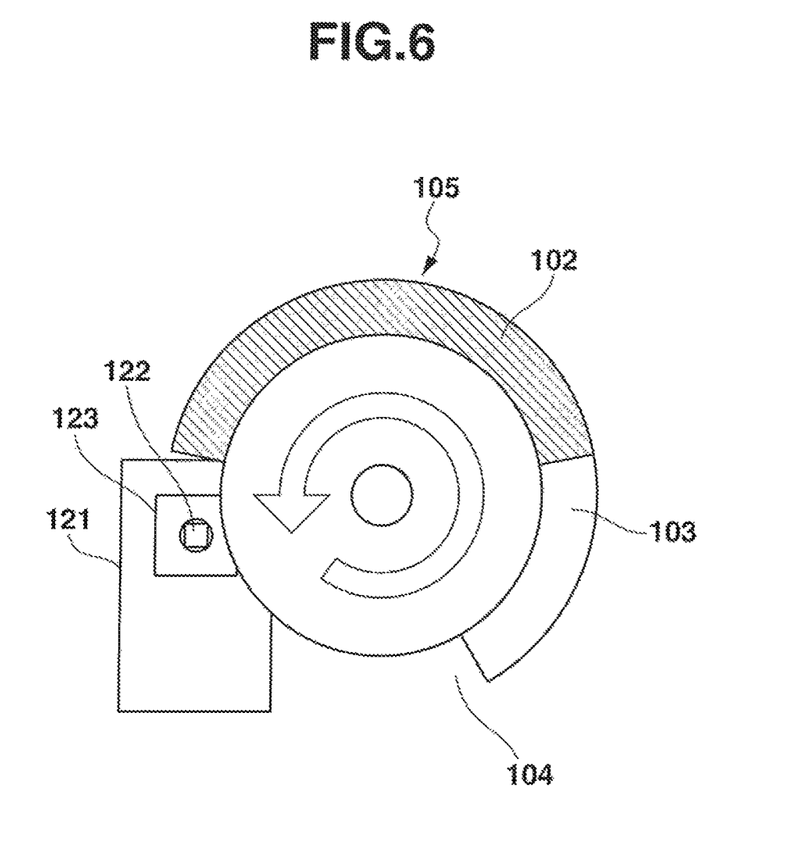
FIG. 6 is a front view of a luminescent material wheel and a third light source device according to a third embodiment of the invention.

In the first and second embodiments, light in the blue wavelength range is reflected on the light emitting surface 122 of the red light source 121 which is disposed on the rear surface side of the luminescent material wheel 101 or the cover glass 123 which is provided on the surface of the red light source 121. However, in a third embodiment, a reflecting area 103 is provided on a luminescent material wheel 105 so that light in the blue wavelength range is reflected by the reflecting area 103.

Namely, as shown in FIG. 6, a luminescent light emitting area 102 and a reflecting area 103 are formed on a side of a luminescent material wheel 105 which faces blue light sources 71, and a transmitting area 104 is also formed annularly in such a way as to be aligned circumferentially with the luminescent light emitting area 102 and the reflecting area 103.

Similar to the first embodiment and the second embodiment, the luminescent light emitting area 102 receives light in the blue wavelength range from the blue light sources 71 to emit luminescent light in the green wavelength range towards the blue light sources 71. The reflecting area 103 is an area which reflects light in the blue wavelength range which is shone on to it towards the blue light sources 71, and a diffusing layer is provided on a reflecting surface of the reflecting area 103 to diffuse reflected light.

Similar to the first embodiment and the second embodiment, the transmitting area 104 is an area which transmits light in the red wavelength range emitted from red light source 121, and similar to the first embodiment, a red light emitting diode is used for this red light source 121.

In this third embodiment, too, light in the blue wavelength range which is emitted from the blue light sources 71 towards a front panel 12 passes through a polarizing dichroic mirror 141 and then passes through a quarter-wave plate 111 to be collected by a collective lens 112. The light in the blue wavelength range so collected is then reflected in the direction of the blue light sources 71 by the reflecting area 103 of the luminescent material wheel 105 and is then collected by the collective lens 112 again. Then, the light in the blue wavelength range which is reflected in the direction of the blue light sources 71 passes through the quarter-wave plate 111 again to be changed from circularly polarized light to linearly polarized light, resulting in S-polarized light in the blue wavelength range. The S-polarized light in the blue wavelength range is reflected by the polarizing dichroic mirror 141 to thereby be emitted towards a left side panel 14.

Similar to the first embodiment and the second embodiment, light in the green wavelength range and light in the red wavelength range pass through the quarter-wave plate 111 and are then reflected by the polarizing dichroic mirror 141 to thereby be emitted towards the left side panel 14.

It is noted that there may be a situation in which the polarizing dichroic mirror 141 has a characteristic to reflect P-polarized light and transmit S-polarized light.

Namely, an axis of light in the red wavelength range, which is light in a third wavelength range from a third light source device 400, is made to coincide with an optical axis of a light tunnel 114. The surface of the luminescent material wheel 105 is oriented in the direction of the light tunnel 114, and a first light source device 70 is disposed near the front panel 12 or a back panel 13. Then, the axis of light in the red wavelength range is made to intersect an axis of light in the blue wavelength range, which is light in a first wavelength range, at right angles in a position where the polarizing dichroic mirror 141 is disposed. P-polarized light in the first wavelength range emitted from the first light source device 70 is reflected by the polarizing dichroic mirror 141 to thereby be shone on to a second light source device 100 and the third light source device 400.

As this occurs, the polarizing dichroic mirror 141 which reflects P-polarized light and reflects S-polarized light is given a dichroic characteristic to transmit light in a second wavelength range emitted from the second light source device 100 and light in the third wavelength range emitted from the third light source device 400.

Thus, as has been described heretofore, in the embodiments of the invention, the blue light sources 71 of the first light source device 70 which emit light in the blue wavelength range, the luminescent material wheel 101, 105 of the second light source device 100 which has the luminescent light emitting area 102 which receives light in the blue wavelength range from the blue light sources 71 to emit light in the green wavelength range, and the red light source 121 of the third light source device 400 which emits light in the red wavelength range are disposed so that the axes of blue light, green light and red light which are emitted individually from the first, second and third light sources follow the same linear path. This serves to line up the axes of blue light, green light and red light, thereby making it possible to simplify the optical path. The third light source device 400 utilizes the solid-state light emitting device or the LED which is superior to a red luminescent material in luminance, color purity and luminous efficiency, whereby it is possible to realize the light source unit 60 and the projector 10 which can form a projected image which is bright and superior in color reproduction properties.

The second light source device 100 includes the luminescent material wheel 105 and the wheel motor 110, and the luminescent material wheel 105 has the luminescent light emitting area 102 which emits light in the green wavelength range and the transmitting area 104 which transmits light, the luminescent light emitting area 102 and the transmitting area 104 being arranged end to end in the circumferential direction. This allows light in the green wavelength range, light in the red wavelength range and light in the blue wavelength range to be easily lined up with one another to follow the same light axis for emission in the same direction while simplifying the configuration of the second light source device 100.

The blue light sources 71 of the first light source device 70 is made up of the blue laser diodes, the red light source 121 of the third light source device 400 is made up of the red light emitting diode, and the green luminescent material layer is formed on the luminescent light emitting area 102 of the luminescent material wheel 105 in the second light source device 100. This makes it easy to emit light having high intensity together light in the red wavelength range as light in the blue wavelength range and light in the green wavelength range, thereby making it possible to obtain efficient light source light.

The detection circuit is provided on the red light source 121 of the third light source device 400 to detect an electric current which is excited by light in the blue wavelength range emitted from the blue light sources 71 to be shone on to the light emitting surface 122 of the red light source 121. This enables the detection of whether or not the blue light sources 71 are turned on or off and the rotational position of the luminescent wheel 105 without providing a sensor for detecting the rotational position of the motor, thereby making it possible to fabricate the light source unit 60 which is small in size and light in weight at low cost.

The third light source device 400 also includes the dichroic mirror layer, which reflects light in the first wavelength range, and the diffusing layer which are provided on the surface of the red light source 121. This enables light in the blue wavelength range to be reflected on the surface of the third light source device 400 easily and efficiently.

Further, as shown in FIG. 6, there may be a situation in which the reflecting area 103 which reflects light in the blue wavelength range and the transmitting area 104 which transmits light in the red wavelength range are provided on the luminescent material wheel 105. This enables light in the blue wavelength range to be reflected in such a way as to coincide with the emitting position of light in the green wavelength range from the luminescent light emitting area 102 and also enables the emitting position of light in the red wavelength range to coincide with the emitting position of light in the green wavelength range.

The polarizing dichroic mirror 141 is made to transmit P-polarized or S-polarized light in the blue wavelength range while reflecting S-polarized or P-polarized light in the blue wavelength range and to reflect light in the green wavelength range and light in the red wavelength range. This facilitates the emission of three primary colors of light in the different direction from the optical axes of the first light source device 70, the second light source device 100 and the third light source device 400 whose axes are lined up with one another or facilitates the emission of three primary colors of light in the direction which coincides with the axes of the second light source device 100 and the third light source device 400 by changing the position of the first light source device 70, whereby the light source unit 60 can easily be built in the projector 10.

In the light source unit 60, the polarizing dichroic mirror 141 is disposed so as to intersect the optical axes of the first light source device 70, the second light source device 100 and the third light source device 400 at the angle of 45 degrees. This makes the axis of light transmitted through the polarizing dichroic mirror 141 and the axis of light reflected by the polarizing dichroic mirror 141 differ 90 degrees from each other, facilitating the matching of the axes of the different wavelength ranges of light within the light source unit 60 and the matching of the axes of the different wavelength ranges of light emitted from the light source unit 60, whereby the light source unit 60 can be made small in size.

The embodiments that have been described heretofore are presented as illustrating the invention, and there is no intention to limit the invention by the embodiments. These novel embodiments can be carried out in other various forms, and various omissions, replacements and modifications can be made to them without departing from the spirit and scope of the invention. These embodiments and their modifications are included in the spirit and scope of the invention and are also included in the scope of inventions claimed separately and equivalents thereof.

What is claimed is:

1. A light source unit comprising:
   a first light source device for emitting light in a first wavelength range;
   a second light source device which is disposed on an axis of the light in the first wavelength range and has a luminescent light emitting area for emitting light in a second wavelength range by receiving the light in the first wavelength range; and
   a third light source device which is disposed on the axis of the light in the first wavelength range so as to face the first light source device, for emitting light in a third wavelength range,
   wherein the second light source device is disposed between the first light source device and the third light source device.

2. The light source unit according to claim 1, further comprising:
   a polarizing dichroic mirror which is disposed between the first light source device and the second light source device for reflecting the light in the second wavelength range and the light in the third wavelength range and transmitting or reflecting the light in the first wavelength range depending upon a polarized direction thereof; and
   a quarter-wave plate which is disposed between the polarizing dichroic mirror and the third light source device.

3. The light source unit according to claim 1, wherein the second light source device comprises a luminescent material wheel and a wheel motor, and
   wherein the luminescent material wheel has the luminescent light emitting area and a transmitting area, which transmits light, which are provided end to end in a circumferential direction of the luminescent material wheel.

4. The light source unit according to claim 2, wherein the second light source device comprises a luminescent material wheel and a wheel motor, and
   wherein the luminescent material wheel has the luminescent light emitting area and a transmitting area, which transmits light, which are provided end to end in a circumferential direction of the luminescent material wheel.

5. The light source unit according to claim 1, wherein the first light source device is a blue laser diode, the third light source device is a red light emitting diode, and the luminescent light emitting area of the second light source device is formed of a green luminescent material layer.

6. The light source unit according to claim 2, wherein the first light source device is a blue laser diode, the third light source device is a red light emitting diode, and the luminescent light emitting area of the second light source device is formed of a green luminescent material layer.

7. The light source unit according to claim 3, wherein the first light source device is a blue laser diode, the third light source device is a red light emitting diode, and the luminescent light emitting area of the second light source device is formed of a green luminescent material layer.

8. The light source unit according to claim 4, wherein the first light source device is a blue laser diode, the third light source device is a red light emitting diode, and the luminescent light emitting area of the second light source device is formed of a green luminescent material layer.

9. The light source unit according to claim 1, wherein the third light source device comprises a detection circuit for detecting an electric current excited by the light in the first wavelength range which is shone onto a light emitting surface thereof.

10. The light source unit according to claim 1, wherein the third light source device has a dichroic mirror layer which reflects the light in the first wavelength range and a diffusing layer on a surface thereof.

11. The light source unit according to claim 3, wherein the second light source device has a reflecting area which includes a diffusing layer, together with the luminescent light emitting area and the transmitting area, the luminescent light emitting area, the transmitting area, and the reflecting area being provided end to end in a circumferential direction of the luminescent material wheel.

12. The light source unit according to claim 2, wherein the polarizing dichroic mirror has a polarizing characteristic to reflect P-polarized or S-polarized light in the first wavelength range and transmit S-polarized or P-polarized light in the first wavelength range.

13. The light source unit according to claim 2, wherein the polarizing dichroic mirror is disposed so as to intersect axes of the light in the first wavelength range, the light in the second wavelength range, and the light in the third wavelength range at an angle of 45 degrees.

14. A projector comprising:
the light source unit according to claim 1;
a display device for generating image light;
a projection side optical system for projecting image light emitted from the display device on to a screen; and
a projection control unit for controlling the light source unit and the display device.

* * * * *